(12) United States Patent
Boyadzhyan-Sevak

(10) Patent No.: US 6,268,604 B1
(45) Date of Patent: Jul. 31, 2001

(54) ELECTRON TUNNELING INFRARED SENSOR MODULE WITH INTEGRATED CONTROL CIRCUITRY

(75) Inventor: Vardkes V. Boyadzhyan-Sevak, Los Angeles, CA (US)

(73) Assignee: California Institute of Technology, Pasadena, CA (US)

( * ) Notice: Subject to any disclaimer, the term of this patent is extended or adjusted under 35 U.S.C. 154(b) by 0 days.

(21) Appl. No.: 09/033,353

(22) Filed: Mar. 2, 1998

Related U.S. Application Data

(60) Provisional application No. 60/038,122, filed on Mar. 3, 1997.

(51) Int. Cl.[7] .................................................. G01J 5/00
(52) U.S. Cl. ............................................................ 250/338.1
(58) Field of Search ............................... 250/338.1, 341.1; 600/316; 359/181

(56) References Cited

U.S. PATENT DOCUMENTS 3,891,843 * 6/1975 Parkin .............................. 250/203 R
5,436,452 * 7/1995 Kenny et al. ..................... 250/338.1

* cited by examiner

*Primary Examiner*—Constantine Hannaher
(74) *Attorney, Agent, or Firm*—Fish & Richardson PC

(57) ABSTRACT

In an integrated electron tunneling sensor, an automatic tunneling control circuit varies a high voltage bias applied to the sensor deflection electrode in response to changes in sensor output to maintain the proper gap between the sensor tip and membrane. The control circuit ensures stable tunneling activity in the presence of large signals and other disturbances to the sensor. Output signals from the module may be derived from the amplified sensor output. The integrated sensor module is particularly well adapted for use in blood glucose measurement and monitoring system.

1 Claim, 3 Drawing Sheets

ELECTRON TUNNELING INFRARED SENSOR MODULE WITH INTEGRATED CONTROL CIRCUITRY

CROSS REFERENCE TO RELATED APPLICATIONS

This application claims priority from U.S. Provisional Application Ser. No. 60/038,122, filed Mar. 3, 1997, the entirety of which is incorporated by reference herein.

STATEMENT AS TO FEDERALLY SPONSORED RESEARCH

The invention described herein was made in the performance of work under a NASA contract, and is subject to the provisions of Public Law 96-517 (35 U.S.C. 202) in which the Contractor has elected to retain title.

BACKGROUND OF THE INVENTION

The invention relates generally to the field of tunneling displacement sensors and more specifically to an integrated sensor module including an electron tunneling infrared sensor, such as a Golay cell.

A tunneling displacement sensor made using standard silicon wafer processing techniques and based upon a thermal detection principle, one example of a Golay cell, is described in A miniature high-sensitivity broad-band accelerometer based on electron tunneling transducers, Rockstad, Howard K., et al. Sensors and Actuators, vol. 43, pp. 107–114, 1994 and incorporated here by reference. Referring to FIG. 3, the sensor comprises a gas chamber 19, a membrane 14 at the base of the gas chamber which carries a membrane conductor 15, and a tip 23 below the membrane conductor 15 in a second chamber 17. With a proper spacing set up between the tip 23 and the membrane conductor 15, for example 10 Angstroms, tunneling action occurs. Infrared radiation impacting the sensor heats the gas in the first chamber 19 increasing the pressure on and causing displacement of the membrane 14 and conductor 15. The membrane displacement is registered as a change in the tunneling current from the tip terminal 12.

A variable high voltage bias is applied to a deflection electrode 16 creating an electrostatic force to adjust the spacing between the tip 23 and the membrane 15 for tunneling. Traditionally, the high voltage source has been manually adjusted to establish the tunneling condition which is essential for detecting any force acting on the sensor membrane.

SUMMARY OF THE INVENTION

In one aspect of the invention, a sensor module includes an electron tunneling sensor having a bias input and an output. The sensor produces an output signal in response to a proper bias condition in the sensor. A control circuit has an input connected to the sensor output and an output connected to the bias input. The control circuit includes a feedback circuit which dynamically adjusts the bias signal in response to changes in the output signal to re-balance the sensor to the proper bias condition.

Embodiments may include one or more of the following features. An output circuit for conditioning the sensor output for use by external circuitry may be provided. The output circuit may provide an amplified representation of the sensor output signal. The control circuit may include a filter having a predetermined frequency response. The control circuit may include a first amplifier having an input connected to the sensor and an output. The control circuit may further include an integrating amplifier having an input connected to the output of the first amplifier and an output connected to the bias input. An output buffer having an input connected to the output of the first amplifier may be provided with a clamp for limiting to within a preselected range the magnitude of the output. The sensor may include a Golay cell.

In another aspect of the invention, a measurement system includes an infrared radiation generator having a radiation output for providing a radiation signal and a signal generator having a signal output. A chopper modulator has an input connected to the radiation output, a modulation input connected to the signal output, and a chopper output. The chopper modulator provides a modulated radiation signal on the chopper output. An electron tunneling sensor has a bias input and an output and the sensor produces an output signal in response to a proper bias condition in the sensor. A control circuit has an input connected to receive the sensor output signal and an output connected to provide a bias signal to the bias input. The control circuit includes a feedback circuit which dynamically adjusts the bias signal in response to changes in the sensor output signal to re-balance the sensor to the proper bias condition. An output circuit connected to the control circuit provides a sensor output to an output device.

In another aspect of the invention, a control circuit is provided for operating an electron tunneling sensor of the kind having a sensor output and a deflection input. The control circuit includes a first input for connection to the sensor output for sensing the level of tunneling activity in said sensor. A bias output for connection to the deflection input of the sensor is provided to adjust the bias level to the sensor. A variable bias circuit has a bias control input connected to the first input and an output connected to the bias output. The bias circuit is responsive to signals from the bias control input and dynamically adjusts the bias signal in response to changes in the tunneling activity to re-balance the sensor to the proper bias condition.

In another aspect of the invention, a method of operating an electron tunneling sensor of the kind having a sensor output and a deflection input includes receiving an output signal from the sensor output for sensing the level of tunneling activity in the sensor. A deflection bias level is dynamically adjusted. The deflection bias level is output to the deflection input of the sensor. Changes in the output signal indicative of changes in the tunneling activity are sensed and the deflection bias level is dynamically adjusted in response to the changes to re-balance the sensor to the proper bias condition.

Other aspects, features, and embodiments will become apparent from what follows.

DESCRIPTION OF THE PREFERRED EMBODIMENTS

Figure 1:
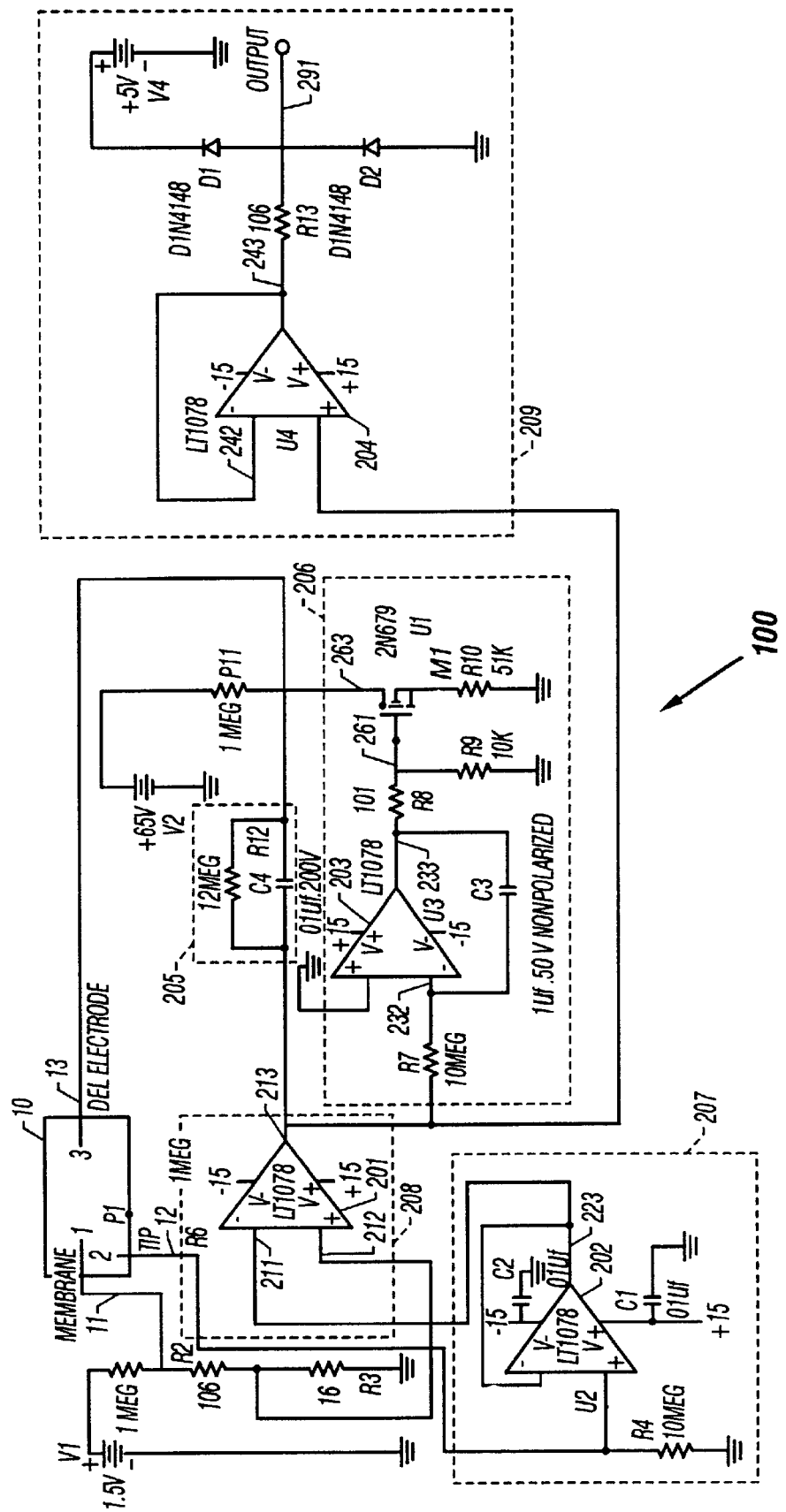
FIG. 1 is a schematic circuit diagram of an integrated sensor module.
Figure 2:
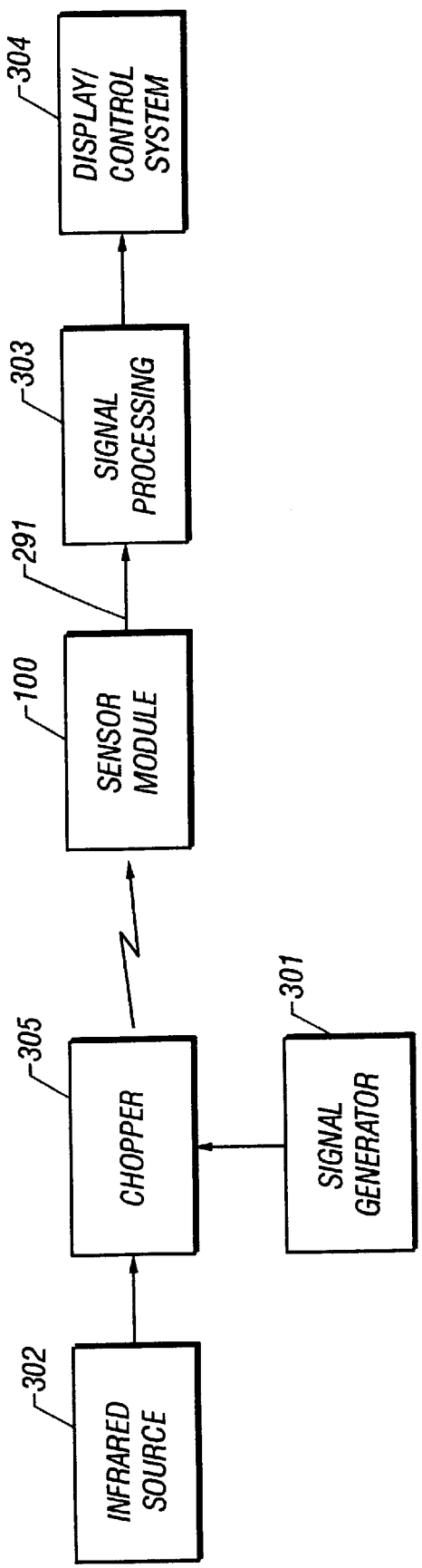
FIG. 2 is a schematic block diagram of a glucose level measurement system using the sensor module of FIG. 1.
Figure 3:
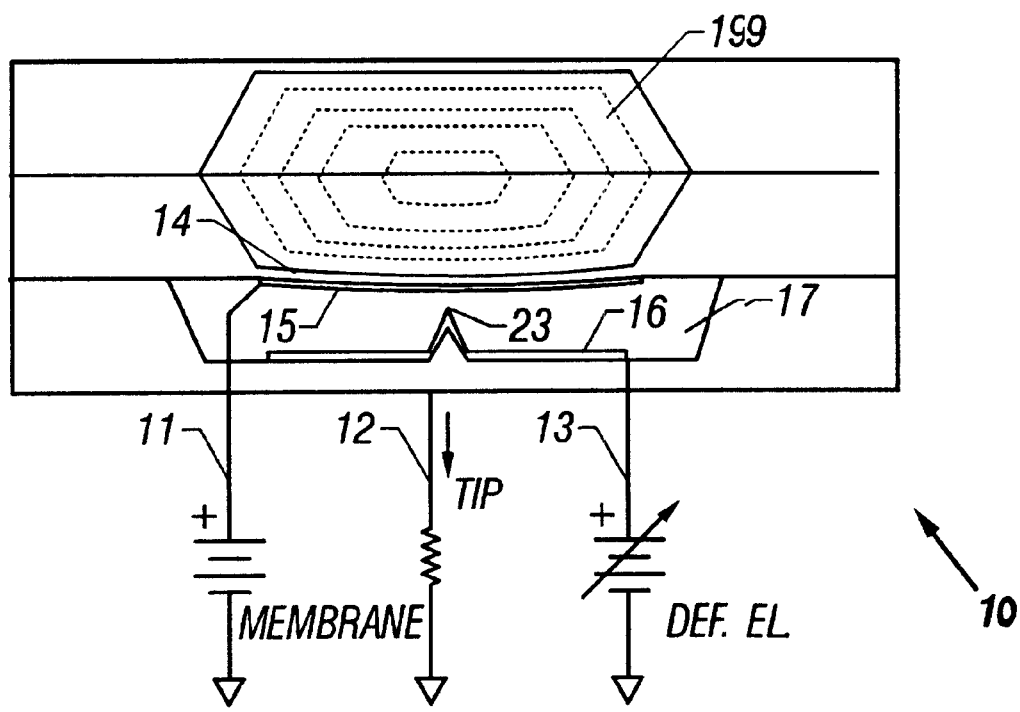
FIG. 3 is a cross-section diagram of a tunneling displacement sensor suitable for use in the sensor module.

In FIG. 1, a sensor module 100 in accordance with the present invention has an electron tunneling infrared sensor 10 (such as for example shown in FIG. 3) connected to a feedback control circuit for maintaining sensor bias and providing a sensor output. Referring to FIG. 2, a modulated infrared source may be employed with the sensor module 100 when used, for example, to detect glucose levels in the blood or tissue. In FIG. 2, infrared source 302 has an output connected to the radiation input of chopper 305. A signal generator 301 has an output connected to the modulation input of chopper 305. The chopper modulates the infrared signal from the source 302 using the signal generator signal. For example, the signal generator may provide a chopping signal having a frequency of 350 Hz. The output signal from the sensor module will typically be a sinusoid having a dominant frequency at about the chop frequency and having variations in amplitude due to changes in the irradiance, i.e., heat intensity, impacting the sensor 10. The output 291 may be fed to signal processing circuitry 303 which may include a spectrum analyzer or a Fourier processor. The output from the signal processing circuitry 303 may be input to a display or control system 304.

Referring to FIG. 1, an electron tunneling infrared sensor 10, such as for example a Golay sensor, has a membrane terminal 11 for connecting to the membrane electrode 15 (FIG. 3), a tip terminal 12 for connecting to the tip 23 (FIG. 3), and a deflection terminal 13 for connecting to the deflection electrode 16. A small bias voltage (approximately 160 mV) set up by the voltage divider (R2+R3)/(R1+R2+R3) is applied to the membrane terminal 11. The sensor output current from the tip terminal 12 is fed to a unity-gain buffer amplifier 207. Buffer amplifier 207 acts as a buffer presenting a high impedance load of approximately 10 Megohms on the sensor output 12 and providing a low impedance output 213 for the sensor output signal.

When the sensor is properly biased and the proper distance between the membrane and tip is established tunneling activity will be present in the sensor producing a tunneling current at the sensor output, tip terminal 12. Typically, the sensor output current is of the order of 1.5 nanoAmps ($1.5 \times 10^{-9}$ Amperes) when the sensor is properly biased for tunneling. Accordingly, an approximately 15 mV ($15 \times 10^{-3}$ Volts) DC voltage drop is established across resistor R4 when the tunneling is present in the sensor. Preferably a low noise resistor is used for R4. The sensor output current drops to approximately zero nanoAmps when the tunneling action is not present.

The output 223 of buffer amplifier 207 is fed to op-amp comparator 208. A reference voltage of approximately 15 mV is set up by the voltage divider of R3/(R1+R2+R3) on the non-inverting input of op-amp 201. When there is no tunneling in the sensor 10, the sensor output drops to 0 nanoAmps, the output of buffer amplifier 207 drops to nearly 0 mV, and comparator 208 in turn produces an output of nearly +15 Volts due to the approximately 15 mV reference on non-inverting input 212. In contrast, when tunneling is present, the DC component of the sensor output current is approximately 1.5 nanoAmps which makes the average voltage at the output of buffer 207 a little over 15 mV, and the DC output voltage of comparator 208 is driven toward the −15V rail with increasing tunneling current. The automatic tunneling control loop (buffer 207, comparator 208, integrator 206, and RC filter 205), however, actively nulls the output of comparator 208 to around 0 mV for maximum dynamic range for AC signals.

Displacement of the membrane 15 (FIG. 3) with respect to the tip 23 (FIG. 3) causes fluctuations in the DC tunneling current from the tip terminal 12 of the sensor 10. The fluctuations in the current may be used as a measure of the displacement. The thermal time constant of the tunneling sensor 10 acts as a low pass filter having an high frequency cutoff around 300 Hz (however the high frequency cutoff may vary widely from one sensor to another due to mechanical differences between sensors) thus the signal may appear sinusoidal due to the low pass filter effects of the sensor 10. Of course, the sensor module 100 may be used to measure ambient radiation without the infrared source, chopper, and signal generator apparatus shown in FIG. 2.

The output 291 of sensor module 100 is driven by an output-clamped non-inverting op-amp buffer 209. Op-amp 204 has its non-inverting input connected to the output of comparator 208. Resistor R13 connects the output 243 of op-amp 204 to the sensor module output 291 which is clamped by diodes D1 and D2 to within the range of −0.3 to +5.3 Volts. Schottky diodes are preferred for their lower junction voltage. The output 291 of the sensor module 100 is clamped to protect circuitry such as an analog-to-digital converter (not shown) which may be connected to the sensor 100.

When the module is connected to an analog-to-digital converter for use with digital signal processing circuitry such as a Fast Fourier Transform processor, the infrared source is preferably adjusted to have a proximity to the sensor and output intensity that produces an approximately 10 nanoAmp peak-to-peak sinusoidal amplitude in the sensor output. The output of comparator 208 will swing approximately between +/−5 volts with a 10 nanoAmp peak-to-peak sensor output. This voltage level uses the maximum input voltage range of an analog-to-digital converter without clipping the positive voltage excursions on the output. Of course, larger (or smaller) signals may be established and the output amplifier 209 gain may be adjusted to scale the output levels as required.

The module output 291 may also be connected to a spectrum analyzer for a frequency analysis of the output. This may be particularly useful when the chopping frequency or the laser wavelength is varied over a selected frequency range or infrared spectrum range in which case the spectrum analyzer may be used to detect specific absorption frequencies or bands.

Thermal stimulus to the sensor 10 or any disturbance to the sensor causing displacement of the membrane may interfere with the tunneling current and hence proper operation of the sensor. The circuit of FIG. 1 dynamically varies the high voltage bias on the deflection electrode 13 to automatically maintain the proper spacing between the membrane conductor 15 and the tip 23 (FIG. 3) in response to disturbances to the sensor thus ensuring continued tunneling activity in the sensor 10.

A feedback control system including servo amplifier 206 which provides a low frequency feed back path and an RC network 205 which provides a high frequency feed back path between comparator 208 and the deflection electrode 13 is shown in FIG. 1. Op-amp 203 is configured as an inverting integrator with an approximately 1.0 second time constant set up by R7 and C3. The integrator has its input 232 connected to receive the amplified tip signal from the output 213 of amplifier 208 and has its output 233 connected to drive the gate 261 of FET M1 through bias resistors R8, R9. The drain 263 of FET M1 is connected to a high voltage bias supply V2 (85 Volts) through resistor R11. The integrator 203 produces an output signal representative of a slow-moving average of the amplified sensor output which is used to control the bias provided by FET M1 on the deflection electrode 15. The servo amplifier 206 has a low pass filter response having a high frequency cutoff of about 10 kHz and a −20 dB per decade rolloff. The bias signal produced by FET M1 is 180 degrees out of phase with the tip signal thus providing negative feedback control of the sensor 10. In this way, slowly changing disturbances to the membrane-tip spacing are corrected by the servo amplifier 206 thereby maintaining tunneling action in the sensor 10.

The RC filter 205 provides a high frequency feedback path in addition to the low frequency feedback path of servo amplifier 206. Resistor R12 and capacitor C4 establish a high-pass connection between the output of amplifier 208 and the deflection electrode 13 of sensor 10. The response characteristic of the RC network 205 is high-pass having a low frequency cutoff at approximately 10 kHz with a roll-off of −20 dB per decade. The high frequency feedback allows the bias to be adjusted in response to high frequency disturbances to the sensor 10.

It will be appreciated that disturbances to the sensor 10 may completely or partially interrupt tunneling activity thus eliminating or reducing the ability of the sensor to perform its function. The feedback bias control circuit of the present invention dynamically varies the bias on the deflection electrode to ensure stable tunneling activity in the sensor in the presence of large signals or other disturbances. Disturbances to the sensor cause perturbations in the tunneling current which are detected by the feedback bias control circuitry which varies the high voltage bias on the deflection electrode thus re-establishing the proper membrane-tip distance and maintaining tunneling activity in the sensor 10 over a wide range of input conditions and other disturbances.

In alternative embodiments, the sensor module circuitry may be simplified. For example, buffer amplifiers 207 and 209 may be omitted and the op-amp in the servo amplifier 206 may be omitted. Op-amps 201, 202, 203, 204 may be FET-input op-amps contained in a single package such as the LT1078 available from Linear Technology, Inc., 1630 McCarthy Blvd., Milpitas, Calif. 95035-7417. Alternatively, the entire circuit may be fabricated on a single chip in which case the circuit may be simplified using standard integrated circuit design and fabrication techniques.

It will be appreciated that a system and method for dynamically controlling the bias level of an electron tunneling sensor in response to signal level changes and other disturbances have been disclosed. Other embodiments are within the scope of the following claims.

What is claimed is:

1. A sensor module comprising:

an electron tunneling sensor having a bias input and an output, the sensor producing an output signal in response to a proper bias condition in the sensor;

a control circuit having an input connected to receive said output signal and an output connected to provide a bias signal to said bias input;

the control circuit further comprising a feedback circuit which dynamically adjusts said bias signal in response to changes in said signal to re-balance said sensor to said proper bias condition;

a first amplifier having an input connected to said sensor and an output;

said control circuit further comprises an integrating amplifier having an input connected to said output of said first amplifier and an output connected to said bias input; and an output buffer having an input connected to said output of said first amplifier and having a clamp for limiting to within a preselected range the magnitude of the output.

* * * * *